June 22, 1971   E. J. ARONOFF ET AL   3,586,531
DIVINYL-MONOVINYL PAINT COMPOSITION AND PAINT PROCESS
Filed Aug. 4, 1969
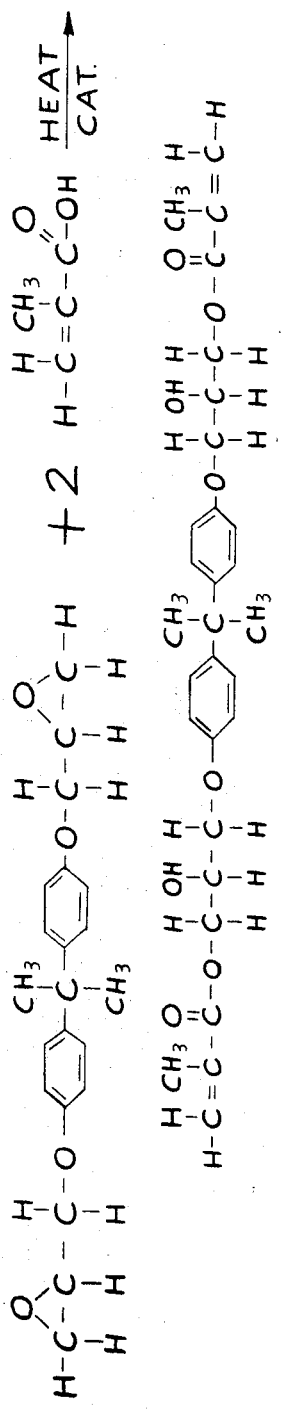
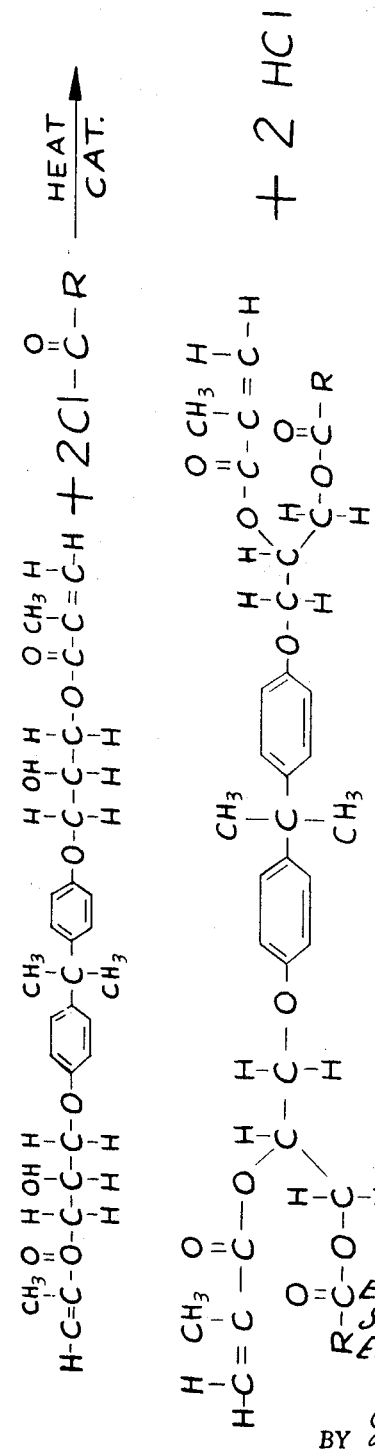
ELIHU J. ARONOFF
SANTOKH S. LABANA
ERNEST O. McLAUGHLIN
INVENTORS
BY John R. Faulkner
Olin B. Johnson
ATTORNEYS United States Patent Office 3,586,531
Patented June 22, 1971

3,586,531
DIVINYL-MONOVINYL PAINT COMPOSITION
AND PAINT PROCESS
Elihu J. Aronoff, Framingham, Mass., and Santokh S.
Labana, Dearborn Heights, and Ernest O. McLaughlin,
Garden City, Mich., assignors to Ford Motor Company, Dearborn, Mich.
Filed Aug. 4, 1969, Ser. No. 847,290
Int. Cl. B44d 1/50; C07c 69/52; C08f 1/24
U.S. Cl. 117—93.31
16 Claims

ABSTRACT OF THE DISCLOSURE

A substrate is coated with a film-forming composition consisting essentially of monovinyl monomers and a unique divinyl compound and the coating is converted to a tenaciously adhering, solvent-resistant, wear and weather-resistant coating by exposing the coated substrate to ionizing radiation, preferably in the form of an electron beam. The divinyl compound is formed by first reacting a diepoxide with acrylic acid and/or methacrylic acid and subsequently reacting the resultant ester condensation product with a saturated acyl halide.

---

This invention relates to the art of coating. It is particularly concerned with a process of painting a substrate having external surfaces of wood, metal or polymeric solid with a film-forming solution comprising unique divinyl compounds and monovinyl monomers and crosslinking such film-forming solution into a wear-resistant, weather-resistant, solvent-resistant, tenaciously adhering film by exposing the same to ionizing radiation, preferably in the form of an electron beam and to the paint used in this process.

In this application, the term "paint" is meant to include pigment and/or finely ground filler, the binder without pigment and/or filler or having very little of the same, which can be tinted if desired. Thus, the paint binder which is ultimately crosslinked by ionizing radiation can be all or virtually all that is used to form the film or it can be a vehicle for pigment and/or particulate filler material.

The first reaction step in preparing the divinyl compound used herein is illustrated herein by the representative reaction shown in FIG. 1 of the accompanying drawing. The second reaction step is illustrated by the representative reaction shown in FIG. 2. In both figures "R" is a $C_2$–$C_{18}$, preferably $C_4$–$C_{10}$, alkyl radical.

The diepoxides employed as starting materials for preparing the divinyl compound of this invention may be of the epichlorohydrin-bisphenol type, the epichlorohydrin-polyalcohol type, or those prepared by reacting diolefins with peracids e.g., peracetic acid, or other means. Diepoxides and their preparations are discussed in detail in Modern Surface Coatings, Paul Nylen and Edward Sunderland, 1965, Science Publishers, a division of John Wyley & Sons Ltd., London—New York—Sydney, Library of Congress catalog card number 65–28344, pp. 197–208. Representative diepoxides include, but not by way of limitation, the following:

(1) 3,4 - epoxy - 6-methyl - cyclohexylmethyl-3,4-epoxymethylcyclohexanecarboxylate.
(2) 1-epoxyethyl-3,4-epoxycyclohexane.
(3) dicyclopentadienedioxide.
(4) dipentene dioxide (limonene dioxide).

(5) diepoxides having structural formula in accordance with the following:

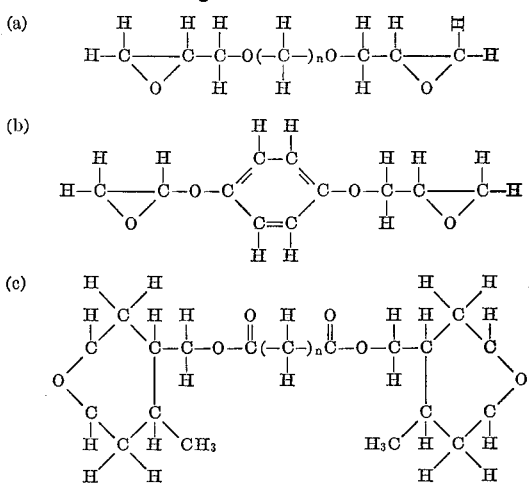

Other suitable diepoxides are disclosed in U.S. Pats. 2,890,202; 3,256,226; 3,373,221 and elsewhere throughout the literature.

The diepoxides employed will usually have molecular weight below about 2,000, more commonly in the range of about 140 to about 500. Usually, the diepoxides will consist of carbon, hydrogen and oxygen but they may be substituted, if desired, with non-interfering substituents, such as halogen atoms, ether radicals and the like. They may be saturated or unsaturated, aliphatic, cycloaliphatic, aromatic or heterocyclic. They may be monomeric or polymeric. The saturated acyl halides are advantageously the chloride of a $C_2$–$C_{18}$, preferably $C_4$–$C_{10}$, saturated, aliphatic, monocarboxylic acid but others may be used, e.g., the corresponding bromides.

The resultant divinyl compounds used herein are homopolymerizable and copolymerizable with mono- and divinyl monomers e.g., styrene, vinyl toluene, alpha-methyl styrene, divinyl benzene, methyl methacrylate, ethyl acrylate, butyl acrylate, butyl methacrylate, hydroxypropyl methacrylate, glycidyl methacrylate, etc., the divinyl reaction product formed by reacting a monoepoxide with acrylic acid or methacrylic acid and then reacting the monovinyl ester condensation product with a vinyl unsaturated acyl halide, a divinyl reaction product formed by reacting a diepoxide with two molar parts of acrylic acid or methacrylic acid, the divinyl reaction product formed by reacting a diepoxide with two molar parts of acrylic acid or methacrylic acid and subsequently reacting the resultant ester condensation product with two molar parts of an alpha-beta olefinically unsaturated acyl halide having an aromatic radical affixed to the beta carbon of the olefinic linkage, e.g., cinnamic acid chloride, the divinyl reaction product formed by reacting the diepoxide with two molar parts of acrylic acid or methacrylic acid and subsequently reacting the resultant ester condensation product with two molar parts of an aromatic substituted saturated acyl halide, e.g., benzoyl chloride, alpha-beta olefinically unsaturated polymers, etc.

The divinyl adducts used herein have lower viscosities than their corresponding divinyl compounds produce by reacting one mole of diepoxide with two moles of acrylic or methacrylic acid. In paints, they form films of greater flexibility than those provided by corresponding amounts of tetravinyl compounds. They have increased solubility in organic solvents in relation to divinyl compounds produced by the first step of this reaction.

Films formed from the paints of this invention are advantageously cured at relatively low temperatures, e.g., between 20° and 70° C. The radiation energy is applied at dose rates of about 0.1 to about 100 Mrad per second upon a preferably moving work piece until the wet film is converted to a tack-free state or until the film is exposed to a desired dosage.

A film-forming material advisably has an application viscosity low enough to permit rapid application to the substrate in substantially even depth and high enough so that at least one mil (0.001 inch) film will hold upon a vertical surface without sagging. Such films will ordinarily be applied to an average depth of about 0.1 to about 4 mils with appropriate adjustment in viscosity and application technique. It will be obvious to those skilled in the art that the choice of diepoxide used in preparing the divinyl compound can be varied so as to vary viscosity of the resultant product. Likewise, the viscosity of the total film-forming composition can be varied by the concentration and choice of monovinyl monomers used therein. The viscosity can also be adjusted by the addition of non-polymerizable, volatile solvents, e.g., toluene, xylene, etc., which can be flashed off after application. By one or more of such adjustments, the viscosity of the paint binder solution can be adapted for application by conventional paint techniques, e.g., spraying, roll coating, etc. Paint binder is preferably applied to the substrate and cured thereon as a continuous film of substantially even depth.

In the method of this invention, the paint binder con- its essentially of about 10 to about 80, preferably about 20 to about 60, parts by weight of the divinyl compound and about 20 to about 90, preferably 40 to about 80, parts by weight monovinyl monomers. A minor portion, i.e., up to slightly below about 50 weight percent of the divinyl compound may be replaced with a tetravinyl compound consisting essentially of carbon, hydrogen and oxygen and having a molecular weight below about 2,600, advisedly between about 220 to about 1100, and preferably between about 220 and about 650, e.g., one of the tetravinyl compounds hereinbefore mentioned and hereinafter illustrated. Also, a minor portion, i.e., up to slightly below about 50 weight percent of the divinyl compound, may be replaced with a different divinyl compound consisting essentially of carbon, hydrogen and oxygen and having a molecular weight in the forementioned range. This invention will be more fully understood from the following illustrative examples:

EXAMPLE 1

A divinyl compound is prepared in the manner below set forth from the material hereinafter named:

(1) To a reaction vessel equipped with a condenser, stirrer, nitrogen inlet and thermometer are charged the following materials:

| | Part by weight |
|---|---|
| (a) Diepoxide [1] | 192 |
| (b) Methacrylic acid | 86 |
| (c) Toluene (solvent) | 500 |
| (d) Dimethyl benzylamine (catalyst) | 1 |

[1] See following formula:

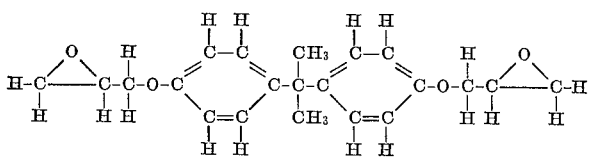

(2) The diepoxide, the methacrylic acid and the dimethyl benzylamine are intimately mixed and incrementally added to the toluene which is at 90° C. in a nitrogen atmosphere.

(3) The reaction mixture is maintained at 90° C. until reaction of the epoxide group is essentially complete as measured by a product acid number of less than about 10.

(4) The solvent is removed under vcauum and a solid reaction product (softening point 45° C.) is recovered.

(5) The solid reaction product of (4) in the amount of 280 parts by weight is dissolved in 500 parts by weight of toluene, and 95 parts by weight of buytric acid chloride are added dropwise with the reaction mix maintained at 65° C. until HCl evolution ceases.

(6) The solvent is removed under vacuum and the divinyl compound is recovered.

Substrates of wood, glass, metal and polymeric solids, i.e., polypropylene and acrylonitrile-butadiene-styrene copolymer, are coated with this divinyl compound using the following procedure.

(1) A solution is prepared from 10 parts by weight of this divinyl compound and 90 parts by weight of an equal molar mix of methylmethacrylate, butyl acrylate and 2-ethylhexyl methacrylate. This solution is sprayed on the forementioned substrates to an average depth of about 1 mil (0.001 inch). The coated substrate is passed through a nitrogen atmosphere and at a distance of about 10 inches below the electron emission window of a cathode ray type, electron accelerator through which an electron beam is projected upon the coated surface until the wet coating is polymerized to a tack-free state. The electrons of this beam have an average energy of about 275,000 electron volts with a current of about 25 milliamperes.

(2) A second group of substrates are coated in the manner above set forth using the same conditions and materials except for the single difference that the paint binder solution used consists of 20 parts by weight of the divinyl compound and 80 parts by weight of an equal molar mix of methyl methacrylate and styrene.

(3) A third group of substrates are coated in the manner above set forth using the same conditions and materials except for the single difference that the paint binder solution used consists of 80 parts by weight of the divinyl compound and 20 parts by weight of methyl methacrylate and is reduced to a desired spraying consistency with acetone. The acetone is permitted to flash off after application and prior to irradiation.

(4) A fourth group of substrates are coated in the manner above set forth using the same conditions and materials except for the sole difference that the paint binder solution used consists of 60 parts by weight of the divinyl compound and 140 parts by weight of a mix of methyl methacrylate, ethyl acrylate and butyl methacrylate.

EXAMPLE 2

The procedure of Example 1 is repeated except that the diepoxide employed is 3,4-epoxy-6-methyl cyclohexylmethyl-3,4-epoxymethyl cyclohexanecarboxylate.

EXAMPLE 3

The procedure of Example 1 is repeated except that the diepoxide employed is 1-epoxyethyl-3,4-epoxycyclohexane.

EXAMPLE 4

The procedure of Example 1 is repeated except that the diepoxide employed is dicyclopentadienedioxide.

EXAMPLE 5

The procedure of Example 1 is repeated except that the diepoxide empoyled is dipentene dioxide.

EXAMPLE 6

The procedure of Example 1 is repeated except that the diepoxide employed has structural formula in accordance with the formula hereinbefore set forth and identified as diepoxide (5)(a) wherein $n$ is 4.

EXAMPLE 7

The procedure of Example 1 is repeated except that the diepoxide employed has structural formula in accordance with the formula hereinbefore set forth and identified as diepoxide (5)(b).

EXAMPLE 8

The procedure of Example 1 is repeated except that the diepoxide employed has structural formula in accordance with the formula hereinbefore set forth and identified as diepoxide (5)(c) wherein $n$ is 4.

EXAMPLE 9

The procedure of Example 1 is repeated with the sole difference that the electrons of the electron beam have an average energy of about 350,000 electron volts.

EXAMPLE 10

The procedure of Example 1 is repeated with the sole difference that the atmosphere of irradiation is helium.

EXAMPLE 11

The procedure of Example 1 is repeated with the sole difference that acetyl chloride is substituted for the butyric acid chloride.

EXAMPLE 12

The procedure of Example 1 is repeated with the sole difference that butyric acid bromide is substituted for the butyric acid chloride.

EXAMPLE 13

The procedure of Example 1 is repeated with the sole difference that capric (decanoic) acid chloride is substithe butyric acid chloride.

EXAMPLE 14

The procedure of Example 1 is repeated with the sole difference that capric (decanoic) acid chloride is substituted for the butyric acid chloride.

EXAMPLE 15

The procedure of Example 1 is repeated with the sole difference that lauric (dodecanoic) acid chloride is substituted for the butyric acid chloride.

EXAMPLE 16

The procedure of Example 1 is repeated with the sole difference that stearic (octadecanoic) acid chloride is substituted for the butyric acid chloride.

EXAMPLE 17

A divinyl compound is prepared as in Example 1 and a tetravinyl compound is prepared using the same procedure with the single difference that methacryloyl chloride is substituted for the second step reactant butyric acid chloride used in the preparation of the divinyl compound. Substrates are then coated as in Example 1 with the sole difference that in the paint binder solution 49 weight percent of the divinyl compound is replaced with an equal amount by weight of the tetravinyl compound.

Additional substrates are coated in like manner except that in the paint binder solution one weight percent of the divinyl compound is replaced with an equal amount by weight of the tetravinyl compound.

Additional substrates are coated in like manner except that in paint binder solution 25 weight percent of the divinyl compound is replaced with an equal amount by weight of the tetravinyl compound.

EXAMPLE 18

A divinyl compound is prepared as in Example 1 and a different divinyl compound is prepared using the same procedure with the single exception that cinnamic acid chloride is substituted for the second step reactant butyric acid chloride used in preparation of the divinyl compound of Example 1. Substrates are then coated as in Example 1 with the sole difference that in the paint binder solution 49 weight percent of the divinyl compound derived from butyric acid chloride is replaced with an equal amount by weight of the divinyl compound derived from cinnamic acid chloride.

Additional substrates are coated in like manner except that in the paint binder solution 25 weight percent of the divinyl compound derived from butyric acid chloride is replaced with an equal amount by weight of the divinyl compound derived from cinnamic acid chloride.

EXAMPLE 19

Divinyl compound is prepared as in Example 1 and a different divinyl compound is prepared using the same procedure with the single exception that one molar part of cyclopentene oxide is reacted with one molar part of methacrylic acid to open the epoxide ring and provide a monovinyl compound and then the resultant ester condensation product is reacted with methacryloyl chloride to provide a divinyl compound. Substrates are then coated as in Example 1 with the sole difference that in the paint binder solution 49 weight percent of the divinyl compound derived from the diepoxide is replaced with an equal amount by weight of the divinyl compound derived from the monoepoxide.

Additional substrates are coated in like manner except that in the paint binder solution one weight percent of the divinyl compound derived from the diepoxide is replaced with an equal amount by weight of the divinyl compound derived from the monoepoxide.

Additional substrates are coated in like manner except that in the paint binder solution 25 weight percent of the divinyl compound derived from the diepoxide is replaced with an equal amount by weight of the divinyl compound derived from the monoepoxide.

EXAMPLE 20

A divinyl compound is prepared as in Example 1 and a different divinyl compound is prepared using the same procedure employed in the first step of preparing the divinyl compound of Example 1. Substrates are coated as in Example 1 with the sole difference that in the paint binder solution 49 weight percent of the divinyl compound prepared as in Example 1 is replaced with an equal amount by weight of the divinyl compound formed solely by reacting the diepoxide with two molar amounts of methacrylic acid.

Additional substrates are coated in like maner except that in the paint binder solution one weight percent of the divinyl compound prepared as in Example 1 is replaced with an equal amount by weight of the divinyl compound prepared solely by reacting the diepoxide with two molar amounts of methacrylic acid.

Additional substrates are coated in like manner except that in the paint binder solution 25 weight percent of the divinyl compound prepared as in Example 1 is replaced with an equal amount by weight of a divinyl compound prepared solely by reacting the diepoxide with two molar amounts of methacrylic acid.

EXAMPLE 21

A divinyl comound is prepared as in Example 1 and a different divinyl compound is prepared using the same procedure except that benzoyl chloride is substituted for the butyric acid chloride. Substrates are coated as in Example 1 with the sole difference that in the paint binder solution 49 weight percent of the divinyl compound prepared as in Example 1 is replaced with an equal amount by weight of a divinyl compound prepared with benzoyl chloride.

Additional substrates are coated in like manner except that in the paint binder solution one weight percent of the divinyl compound prepared as in Example 1 is replaced with an equal amount by weight of a divinyl compound prepared with benzoyl chloride.

Additional substrates are coated in like manner except that in the paint binder solution 25 weight percent of the divinyl compound prepared as in Example 1 is replaced with an equal amount by weight of the divinyl compound prepared with benzoyl chloride.

The term "ionizing radiation" as employed herein means radiation having sufficient energy to effect polymerization of the paint films herein disclosed, i.e., energy equivalent to that of about 5,000 electron volts or greater. The preferred method of curing films of the instant paint upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece when the intervening space is occupied by air. Adjustment can be made for the relative resistance of the intervening gas which is preferably an oxygen-free inert gas such as hydrogen or helium.

The abbreviation "rad" as employed herein means that dose of radiation which results in the absorption of 100 ergs of energy per gram of absorber, e.g., coating film. The abbreviation "Mrad" as employed herein means 1 million rad. The electron emitting means may be a linear electron accelerator capable of producing a direct current potential in the range of about 100,000 to about 500,000 volts. In such a device electrons are ordinarily emitted from a hot filament and accelerated through a uniform voltage gradient. The electron beam, which may be about ⅛ inch in diameter at this point, may then be scanned to make a fan-shaped beam and then passed through a metal window, e.g., a magnesium-thorium alloy, aluminum, an alloy of aluminum and a minor amount of copper, etc., of about 0.003 inch thickness.

It will be understood by those skilled in the art that modifications can be made within the foregoing examples without departing from the spirit and the scope of the invention as set forth in the following claims.

We claim:

1. A paint polymerizable by ionizing radiation which, exclusive of nonpolymerizable solvents, pigment and particulate mineral filler, consists essentially of about 20 to about 90 parts by weight monovinyl monomers and about 10 to about 80 parts by weight of a divinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a saturated acyl halide.

2. A paint in accordance with claim 1 wherein said diepoxide has molecular weight below about 2,000.

3. A paint in accordance with claim 1 wherein said diepoxide has molecular weight in the range of about 140 to about 500.

4. A paint in accordance with claim 1 wherein said acid halide is the chloride of a $C_2$–$C_{18}$ saturated, monocarboxylic acid.

5. A paint in accordance with claim 1 wherein said acyl halide is the bromide of a $C_2$–$C_{18}$ saturated, monocarboxylic acid.

6. A paint in accordance with claim 1 wherein an amount up to but less than 20% of said divinyl compound is replaced with a tetravinyl compound consisting essentially of carbon, hydrogen and oxygen having molecular weight below about 2,350.

7. A paint in accordance with claim 1 wherein an amount up to but less than 50% of said divinyl compound is replaced with a divinyl compound having a molecular weight below about 2,600 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of an alpha-beta olefinically unsaturated acyl halide having an aromatic radical affixed to the beta carbon of the olefinic linkage.

8. A paint in accordance with claim 1 wherein an amount up to but less than 50% of said divinyl compound is replaced with a divinyl compound having a molecular weight below about 2200 and formed by reacting one molar amount of a diepoxide with two molar parts of an alpha-beta olefinically unsaturated monocarboxylic acid selected from acrylic acid and methacrylic acid.

9. A paint in accordance with claim 1 wherein an amount up to but less than 50% of said divinyl compound is replaced with a divinyl compound having a molecular weight below about 2,600 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of an aromatic substituted saturated acyl halide.

10. A paint in accordance with claim 1 wherein an amount up to but less than 50% of said divinyl compound is replaced with a different divinyl compound consisting essentially of carbon, hydrogen and oxygen and having a molecular weight in the range of about 220 to about 1100.

11. A paint in accordance with claim 1 wherein an amount up to but less than 50% of said divinyl compound is replaced with a different divinyl compound consisting essentially of carbon, hydrogen and oxygen and having a molecular weight in the range of about 220 to about 650.

12. A paint in accordance with claim 1 wherein an amount up to but less than 50% of said divinyl compound is replaced with a tetravinyl compound consisting essentially of carbon, hydrogen and oxygen and having a molecular weight in the range of about 220 to about 1100.

13. A paint in accordance with claim 1 wherein an amount up to but less than 50% of said divinyl compound is replaced with a tetravinyl compound consisting essentially of carbon, hydrogen and oxygen and having a molecular weight in the range of about 220 to about 650.

14. A paint polymerizable by ionizing radiation which, exclusive of nonpolymerizable solvents, pigments and particulate mineral filler, consists essentially of about 40 to about 80 parts by weight monovinyl monomers and about 20 to about 60 parts by weight of a divinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a saturated acyl halide.

15. In a method for painting a substrate wherein a film-forming solution is applied as a paint film to a surface of said substrate and crosslinked thereon by exposing the coated surface to ionizing radiation, the improvement wherein said film-forming solution, exclusive of nonpolymerizable solvents, pigments and particulate mineral filler, consists essentially of about 20 to about 90 parts by weight monovinyl monomers and about 10 to about 80 parts by weight of a divinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a saturated acyl halide.

16. An article of manufacture comprising in combination a substrate and a polymerized coating of paint formed upon an external surface thereof by applying to said surface a film of substantially even depth of a film-forming solution which, exclusive of nonpolymerizable solvents, pigments and particulate mineral filler, consists essentially of about 20 to about 90 parts by weight monovinyl monomers and about 10 to about 80 parts by weight of a divinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a saturated acyl halide and crosslinking said film upon said surface with ionizing radiation.

References Cited
UNITED STATES PATENTS
3,466,259    9/1969    Jernigan   ---------- 260—836X

FOREIGN PATENTS
1,006,587    10/1965    Great Britain   -------- 260—486

ALFRED L. LEAVITT, Primary Examiner

J. H. NEWSOME, Assistant Examiner

U.S. Cl. X.R.

117—138.8, 161; 204—159.15, 159.16; 260—410.6, 475, 485, 486, 835, 836, 857